United States Patent [19]
Sakamoto

[11] Patent Number: 5,432,866
[45] Date of Patent: Jul. 11, 1995

[54] METHOD FOR DETECTING EYE STRUCTURE AND ITS APPARATUS

[75] Inventor: Shizuo Sakamoto, Tokyo, Japan

[73] Assignee: NEC Corporation, Tokyo, Japan

[21] Appl. No.: 75,800

[22] Filed: Jun. 14, 1993

[30] Foreign Application Priority Data

Jun. 12, 1992 [JP] Japan .................. 4-153128

[51] Int. Cl.$^6$ ............................. G06K 9/00
[52] U.S. Cl. ..................... 382/128; 382/117; 382/199
[58] Field of Search ............ 382/1, 2, 6, 23, 50, 382/48, 9

[56] References Cited

U.S. PATENT DOCUMENTS

| | | | |
|---|---|---|---|
| 4,625,329 | 11/1986 | Ishikawa et al. | 382/1 |
| 4,975,969 | 12/1990 | Tal | 382/2 |
| 5,008,946 | 4/1991 | Ando | 382/2 |
| 5,016,282 | 5/1991 | Tomono et al. | 382/2 |
| 5,199,082 | 3/1993 | Venema | 382/22 |
| 5,231,674 | 7/1993 | Cleveland et al. | 382/22 |
| 5,258,924 | 11/1993 | Call et al. | 382/22 |
| 5,293,427 | 3/1994 | Ueno et al. | 382/6 |

OTHER PUBLICATIONS

Okada et al, "Extract of Characteristic Line from Line Drawing of Face", Research Report #58, Kogaksin University, Apr. 1985, pp. 208-215.

Primary Examiner—Joseph Mancuso
Attorney, Agent, or Firm—Sughrue, Mion, Zinn, Macpeak & Seas

[57] ABSTRACT

The method for detecting an eye structure and its apparatus according to this invention examines an image having an eye and its vicinity of a human face photographed from the vertex to the jaws to detect an area positioned between a position where brightness changes from lightness to darkness and a position where brightness changes from lightness to darkness and then to lightness, and detects from the above area an area whose width is larger than the pupil's width and where an average of brightness values in the above area is darkest as the upper eyelid area. And, the inner canthus, outer canthus and their adjacent upper eyelid line are detected by finding the darkest point on the above image to detect the inner canthus and outer canthus points and their adjacent dot groups which become candidates for the upper eyelid line, and by carrying out the logical OR between the above upper eyelid area and the above dot groups.

11 Claims, 12 Drawing Sheets

FIG. 9
| a8 | a1 | a2 |
|---|---|---|
| a7 | a0 | a3 |
| a6 | a5 | a4 |
FIG. 10
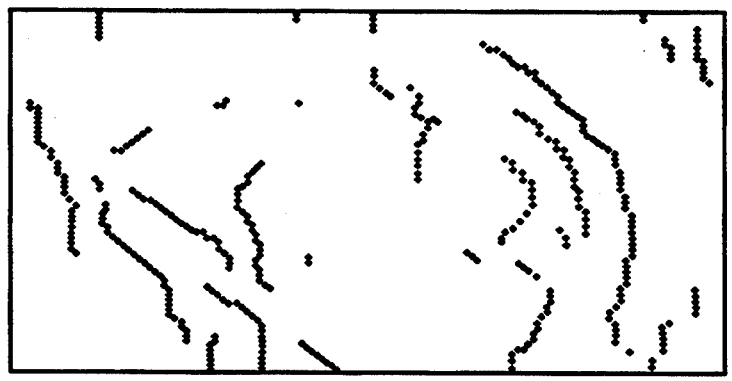
FIG. 11
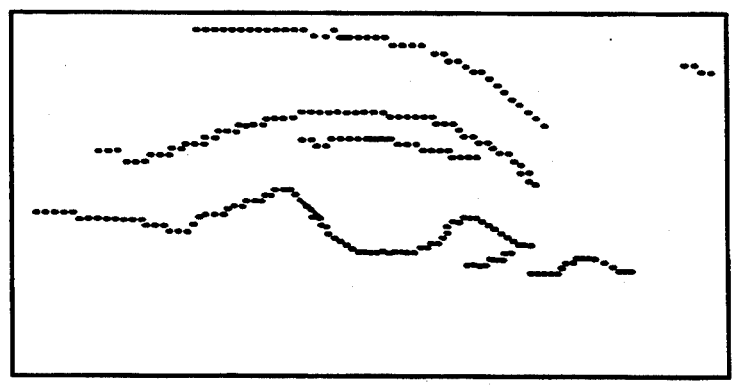

REMOVE

METHOD FOR DETECTING EYE STRUCTURE AND ITS APPARATUS

BACKGROUNDS OF THE INVENTION

1. Field of the Invention

This invention relates to a method for detecting an eye structure based on a figure image and its apparatus, and particularly to a detection method capable of easily detecting the upper eyelid, inner canthus and outer canthus and its apparatus.

2. Description of the Prior Art

A conventional method for detecting the upper eyelid line and inner and outer canthus points based on a figure image is described in publication "Extract of Characteristic Line from Line Drawing of Face" (by Okada, Kiriyama, Nakamura and Minami, Research Report No. 58, Kogakuin University, April 1985). This conventional method will be described below.

FIG. 8 shows an input image 801 illustrating an eye and its vicinity. The X-axis and Y-axis are the horizontal axis and vertical axis of the drawing, respectively. A primary differential operator in the X-axis and Y-axis directions having a feature corresponding to a feature of an eye is applied to the above input image 801. The primary differential operator is suitable to detect a change from lightness to darkness or from dark to lightness in an image. Picture element where the operator output has the maximum value in the X-axis and Y-axis directions is determined as an edge in each axis direction, and its output is given by an output intensity of the primary differential operator.

To each edge image in the X-axis and Y-axis directions, 8-coupled labelling is made to construct a segment. Constructing the segment with 8 coupling is a technique to judge whether the edge picture element exists in the adjacent 8 picture elements a1 to a8 when the observed picture element is determined as a0 in FIG. 9. And, the average and variance of the edge strength are obtained for each segment. When the average and variance of the edge strength are small, the segment is supposed not to construct the upper eyelid and subjected to binary coding process with an appropriate set value to obtain FIG. 10 and FIG. 11 which show an edge binary image in the X-axis and Y-axis directions.

The upper eyelid line consists of one edge line and has the shape of a hill. Concentration dispersion within a closed line formed by the segment consisting this upper eyelid line and the straight line connecting the both ends of the segment is considered to show a characteristic distribution which largely includes dark areas such as the pupil and eyelashes.

And, the inner and outer canthus points are determined to be the both end points of the aforementioned edge segment. A method for detecting the upper eyelid line and inner and outer canthus points will be described below.

(1) An upwardly convex segment is extracted from FIG. 11. Definition of the segment which is upwardly convex is made based on FIG. 12 as follows.

(a) A distance between a straight line connecting the both ends of a segment and an optional point on a segment which is perpendicular to the straight line is determined and a point P which is distant most is obtained.

(b) When the longest distance obtained in the above (a) is positioned above the straight line connecting the both ends of the segment, it is defined to be convex upward.

(2) For the upwardly convex lines in FIG. 11, attention is given to one of them. A length of the segment connecting the end point where the outer canthus exists and the point on the 9th picture element from that end point is determined to be $2a$. This segment is further elongated by "$a$" in the direction of the outer canthus to set an isosceles triangle having the base $2a$ and height $3a$ as shown in FIG. 13. And, in this triangle, a segment existing in the solid line of FIG. 7 which is below the horizontal position of the end point is extracted from the picture elements of FIG. 10.

(3) The straight line which is set in the above (2) is determined to be L1. When a straight line passing through points P1 and P2 which are separated in both directions by 4 picture elements from a point of intersection of the straight line L1 and the detected lines is L2, an angle $\theta$ formed by L1 and L2 is obtained (see FIG. 14).

(4) When the line detected in the above (2) continues from the upwardly convex line selected in the above (2), the angle $\theta$ must become small to some extent. Then, a threshold $Th\theta$ of the angle $\theta$ is appropriately determined to extract a line which meets the following:

$$\theta < Th\theta \tag{I}$$

When there are a plurality of segments which are detected in the above (2), a segment with the minimum angle $\theta$ is extracted.

(5) To the whole upwardly convex segment, the above (2) to (4) are applied. The treated upwardly convex segments and the segments extracted with respect to each of the treated upwardly convex segments are connected to make candidate segments for the upper eyelid line.

(6) As to one of the candidate segments for the upper eyelid line, a closed line as shown in FIG. 15 is set by a straight line connecting the end points.

(7) Frequency (dot parts in FIG. 15) of the part of high concentration value exceeding the set value $ThG$ given by the following formula (II) in each closed line is determined:

$$ThG = (Gmax - Gmin)/5 \tag{II}$$

where, $Gmax$ and $Gmin$ shall be maximum and minimum concentration values in the closed line.

(8) A line when frequency of the high concentration value obtained in the above (7) becomes maximum is extracted as the upper eyelid line. On the other hand, when all lines do not include the parts of high concentration value at all, setting of the candidate area of an eye is made again as the upper eyelid line is determined not to exist.

(9) Wrinkles of the outer canthus excessively detected is removed from the detected upper eyelid line. A distance between a straight line connecting the both ends of the upper eyelid line and an optional point on a line which is perpendicular to the straight line is determined to obtain a point which is distant most.

(10) From the point obtained in the above (9) and the end point on the side of outer canthus, a distance is obtained as in the above (9). The range from the longest distance to the end point on the side of outer canthus is removed (see FIG. 16).

The segment obtained in the above process is determined as the upper eyelid line and its both end points as the inner canthus point and outer canthus point.

In the aforementioned conventional method, there are many parameters which have to be adjusted to smoothly operate with respect to a given image. And, the process itself is also complicated, and it is difficult to adjust the parameters when the operation is not conducted satisfactorily. Therefore, lots of troubles and time are required to accurately detect an eye structure.

Since the outer canthus point is smoothly connected with wrinkles, the edge information used here is not sufficient to judge that it is an outer canthus point. Consequently, the detection cannot be made precisely because it is affected by a change in lighting conditions.

Furthermore, although the inner and outer canthus points are obtained under the condition close to the curvature of a segment, the detected results are largely effected by the position of a double-edged eyelid.

SUMMARY OF THE INVENTION

An object of this invention is to provide a method for detecting an eye structure and its apparatus which are capable of easily detecting the eye structure accurately with a small number of parameters and which are not largely affected by lighting conditions and the like. Another object of this invention is to provide an eye structure detecting method and its apparatus which are capable of obtaining a stable detection result and which are not largely affected by wrinkles and a double-edged eyelid.

A method for detecting an upper eyelid area to complete the above objects of this invention comprises:

- a step for examining an image having an eye and its vicinity of a human face photographed from the vertex to the jaws to detect an area positioned between a position where brightness changes from lightness to darkness and a position where brightness changes from lightness to darkness and then to lightness, and
- a step for detecting from the above area an area whose width is larger than the pupil's width and where an average of brightness values in the above area is darkest as the upper eyelid area.

And, a method for detecting an inner canthus, outer canthus and upper eyelid area to complete the above objects of this invention comprises:

- a step for examining an image having an eye and its vicinity of a human face photographed from the vertex to the jaws to detect an area positioned between a position where brightness changes from lightness to darkness and a position where brightness changes from lightness to darkness and then to lightness,
- a step for detecting from the above area an area whose width is larger than the pupil's width and where an average of brightness values in the above area is darkest as the upper eyelid area,
- a step for finding the darkest point on the above image to detect the inner canthus and outer canthus points and their adjacent dot groups which become candidates for the upper eyelid line, and
- a step for carrying out the logical OR between the above upper eyelid area and the above dot groups to detect the inner canthus, outer canthus and their adjacent upper eyelid line.

A method for detecting an inner canthus, outer canthus and upper eyelid line to complete the objects of this invention comprises:

- a step for examining an image having an eye and its vicinity of a human face photographed from the vertex to the jaws to detect an area positioned between a position where brightness changes from lightness to darkness and a position where brightness changes from lightness to darkness and then to lightness,
- a step for detecting from the above area an area whose width is larger than the pupil's width and where an average of brightness values in the above area is darkest as the upper eyelid area,
- a step for finding the darkest point on the above image to detect the inner canthus and outer canthus points and a primary dot group in their vicinity which become a candidate for the upper eyelid line,
- a step for carrying out the logical OR between the above upper eyelid area and the above dot groups to detect the inner canthus, outer canthus and the primary upper eyelid line in their vicinity,
- a step for examining the above image from the vertex, detecting a point where brightness changes from lightness to darkness and carrying out the logical OR between the change point and the above upper eyelid area to detect a secondary dot group which becomes a candidate for the upper eyelid, and
- a step for calculating a distance between the above primary upper eyelid line and the above secondary candidate dot group in the vertex direction to detect a dot group with the smallest distance as a secondary upper eyelid line.

An apparatus for detecting an eye structure to complete the objects of this invention comprises:

- a primary area detecting means for detecting an area positioned between a position where brightness changes from lightness to darkness and a position where brightness changes from lightness to darkness and then to lightness by examining an image having an eye and its vicinity of a human face photographed from the vertex to the jaws,
- an upper eyelid candidate area detecting means for detecting as the upper eyelid candidate area an area whose width is larger than a certain set value from the above area, and
- a secondary area detecting means for detecting as the upper eyelid area an area where an average of brightness values in the above area is darkest from the above upper eyelid candidate area.

In an eye structure detecting apparatus according to a preferable embodiment, the aforementioned primary area detecting means comprises a first differential operating means for firstly differentiating the aforementioned image from the vertex to jaws, a second differential operating means for secondly differentiating the above image from the vertex to jaws, a primary binary-coding means for binary-coding the above firstly differentiated image signal, a secondary binary-coding means for binary-coding the above secondly differentiated image signal, a logical negative operating means for obtaining a logical negative signal from the above binary-coded firstly differentiated image signal, and a logical OR operating means for carrying out the logical OR between the above firstly differentiated image signal of the logical negative and the binary-coded secondly differentiated image signal.

Another eye structure detecting apparatus to complete the objects of this invention comprises:

an upper eyelid area detecting means for detecting an upper eyelid area from an image having an eye and its vicinity of a human face photographed, a primary candidate detecting means for detecting a primary candidate point which is a point where brightness changes from lightness to darkness and then to lightness by examining the image from the vertex, a secondary candidate detecting means for detecting a secondary candidate point which is a point where brightness changes from lightness to darkness and then to lightness by examining the image from the direction perpendicular to the vertex direction, and a logical OR operating means for carrying out the logical OR among the above upper eyelid area detected signal, the above primary candidate point detected signal and the above secondary candidate point detected signal to output as the inner canthus, outer canthus and upper eyelid line detected signals.

In a preferred embodiment, the upper eyelid area detecting means comprises a primary area detecting means for detecting an area positioned between a position where brightness changes from lightness to darkness and a position where brightness changes from lightness to darkness and then to lightness by examining an image having an eye and its vicinity of a human face photographed from the vertex to the jaws, an upper eyelid candidate area detecting means for detecting as the upper eyelid candidate area an area whose width is larger than a certain set value from the above area, and a secondary area detecting means for detecting as the upper eyelid area an area where an average of brightness values is darkest from the above upper eyelid candidate area. In a more preferable embodiment, the primary candidate detecting means and the above secondary candidate detecting means comprise a first differential operating means for firstly differentiating the aforementioned image in the vertex direction or in the direction perpendicular to the vertex direction, a second differential operating means for secondly differentiating the above image in the vertex direction or in the direction perpendicular to the vertex direction, a binary-coding means for binary-coding the above firstly differentiated image signal, a judging means for examining a code of the above secondly differentiated image signal at the boundary of the above binary-coded firstly differentiated image signal to output as the primary or secondary candidate point when it is positive.

Another eye structure detecting apparatus to complete the objects of this invention comprises:

an upper eyelid area detecting means for detecting an upper eyelid area from an image having an eye and its vicinity of a human face photographed, an inner canthus, outer canthus and upper eyelid line detecting means for detecting inner and outer canthus points and a primary upper eyelid line from the above image, a primary detecting means for detecting a primary point where brightness changes from lightness to darkness by examining the above image from the vertex, a secondary detecting means for detecting a dot group which is a candidate for the upper eyelid area by carrying out the logical OR between the detected signal of the above upper eyelid area and the detected signal of the above primary point, and an upper eyelid detecting means for detecting a dot group with the smallest distance as a secondary upper eyelid line by calculating a distance between the above inner and outer canthus points and primary upper eyelid line and the above candidate dot group for the upper eyelid area in the vertex direction.

In a preferred embodiment, the above primary detecting means comprises a first differential operating means for firstly differentiating the aforementioned image in the vertex direction or in the direction perpendicular to the vertex direction, a second differential operating means for secondly differentiating the above image in the vertex direction or in the direction perpendicular to the vertex direction, a binary-coding means for binary-coding the above secondly differentiated image signal, and a judging means for examining a code of the above firstly differentiated image signal at the boundary of the above binary-coded secondly differentiated image signal to output as the primary point when it is positive.

Other objects, characteristics and effects of this invention will be apparent from the following detailed description.

BRIEF DESCRIPTION OF THE DRAWINGS

FIG. 9 is a drawing explaining a constructing method of a segment by 8 coupling.

FIG. 10 is a drawing showing an edge image of an X-axis method for extracting an upper eyelid line in a conventional method.

FIG. 11 is a drawing showing an edge image of a Y-axis method for extracting an upper eyelid line in a conventional method.

DESCRIPTION OF THE PREFERRED EMBODIMENT

Preferable embodiments of this invention will be described with reference to the attached drawings. First, the principle of this invention will be described. This invention is to detect an upper eyelid, inner canthus and outer canthus based on the following features seen on an image.

Features of an upper eyelid:
(1) The upper eyelid is basically regarded as a boundary between the eyeball and other parts covering the eyeball.
(2) The upper eyelid has black eyelashes.
(3) The upper eyelid section which contacts to the pupil is substantially regarded as a boundary between black eyelashes and skin because a boundary between the black eyelash section and the pupil section is hardly seen.
(4) For the upper eyelid sections which contact to the white of the eye, a boundary between eyelashes and skin and a boundary between the eyeball and other parts are seen satisfactorily. The eyelashes are often seen as if continuing from the shadow of wrinkles, making it difficult to judge end points. Therefore, the upper eyelid line in the vicinity of inner and outer canthi is positioned at the darkest point when seen in the direction perpendicular to the eyelid line if it is supposed that the inner and outer canthus points are positioned far back (to be described afterward).
(5) The upper eyelid often accompanies a plurality of parallel wrinkles (double-edged eyelid or the like). In many cases, the double-edged eyelid forms a thin line shape and, when seen in the direction parallel to the lines, it does not form an edge.

Feature of an inner canthus:
(1) The inner canthus is regarded to lie the deepest point of a boundary between the eyeball and other parts. Therefore, it is regarded to position at the darkest point as compared with its vicinity.

Feature of an outer canthus:
(1) The outer canthus is regarded to lie the deepest point of a boundary between the eyeball and other parts. Therefore, it is regarded to position at the darkest point as compared with its vicinity.

The eye structure detecting method of this invention is to detect the upper eyelid, inner canthus point and outer canthus point based on the above features seen on an image. As compared with a conventional method, this method can detect in a simple construction with a small number of parameters. The method will de described below.

The upper eyelid accompanies eyelashes and is the darkest area in the vicinity of an eye excluding the pupil. And, a position where eyelashes start is regarded as a spot where brightness changes from lightness to darkness from the vertex direction. An area between the position where eyelashes start and a part where eyelashes are thickest, i.e., a spot where changes lightness→darkness→lightness are seen (this spot where changes lightness→darkness→lightness are seen becomes V-Ditch Edge in FIG. 7), is regarded as a candidate area for the upper eyelid.

Figure 7:
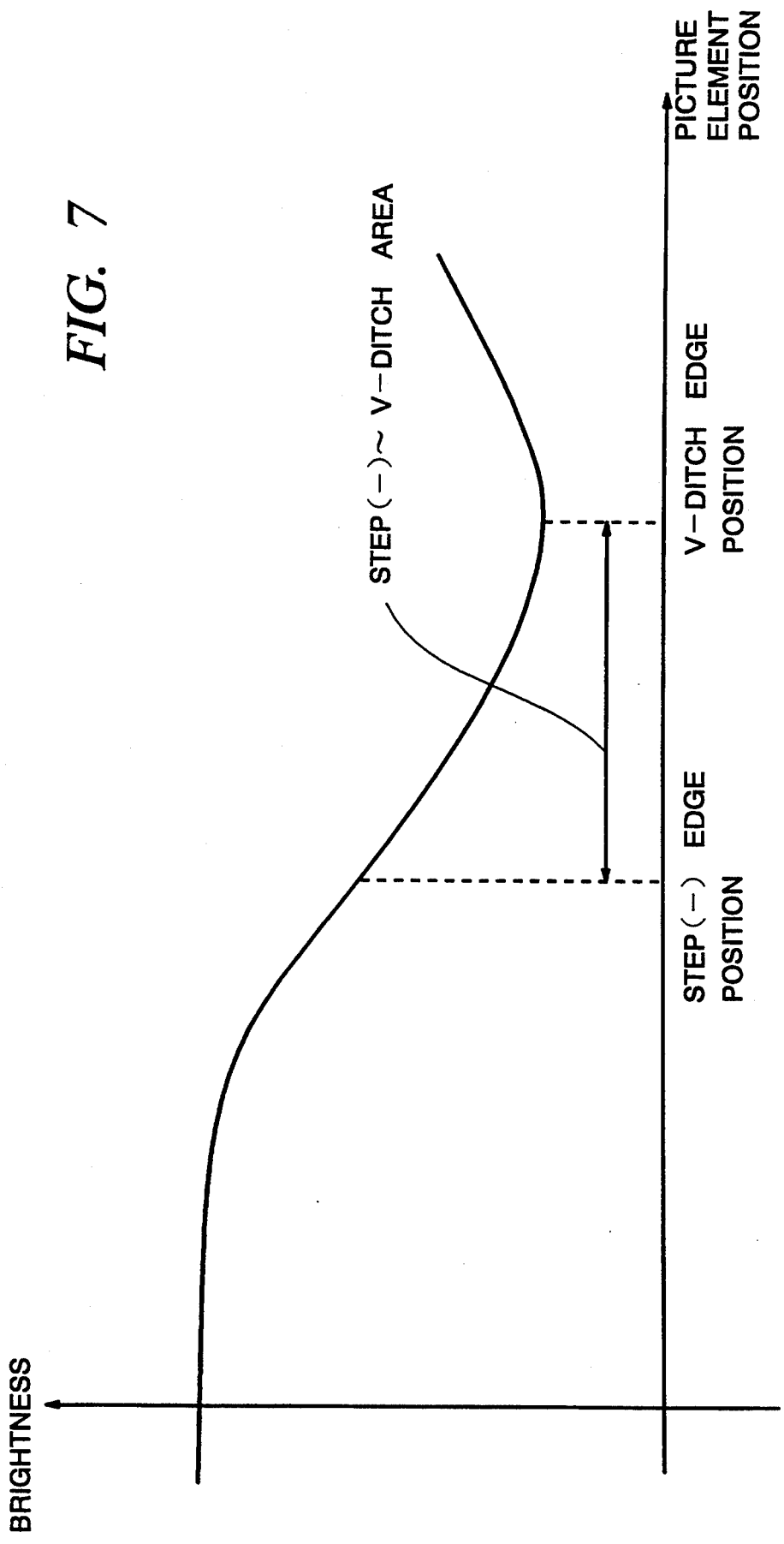
FIG. 7 is a graph explaining Step(-)Edge, V-Ditch Edge and Step(-)Edge through V-Ditch Edge area.

A point where brightness changes from lightness to darkness when seen from the vertex direction is called as Step(-)Edge and a point where brightness changes from lightness to darkness and then to lightness as V-Ditch Edge. And, an area positioned between these edges is called as Step(-)Edge through V-Ditch Edge area. The both edges and the Step(-)Edge through V-Ditch Edge area are shown in FIG. 7.

Step(-)Edge can be detected as a position where a first differential of an image is negative and a second differential is 0. Similarly, V-Ditch Edge can be detected as a position where a first differential of an image is 0 and a second differential is positive. Step(-) through V-Ditch Edge area can be detected as a position where a first differential of an image is negative and a second differential is positive.

Figure 8:
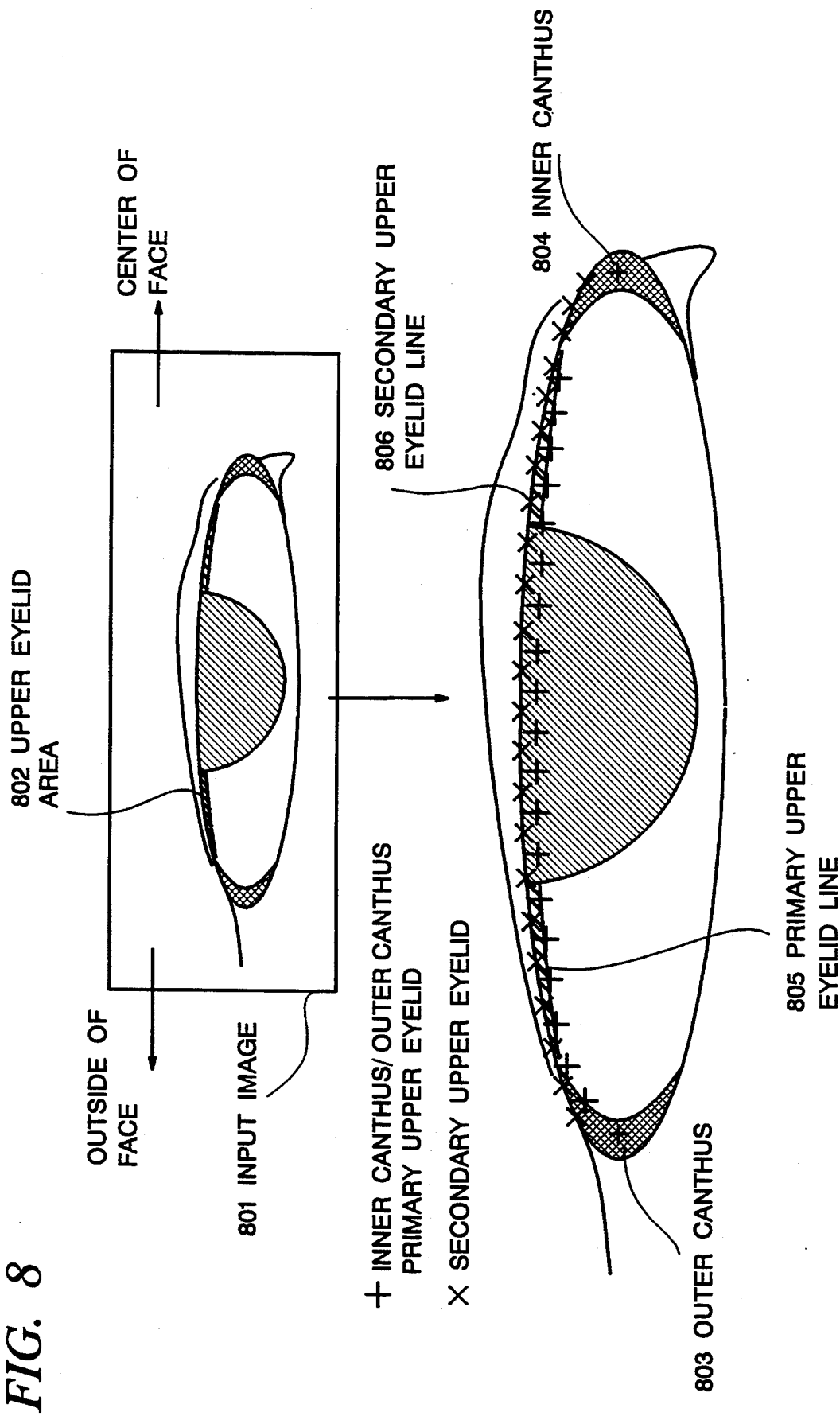
FIG. 8 is a picture showing an eye and its vicinity of a human face subjected to the processing.
Figure 12:
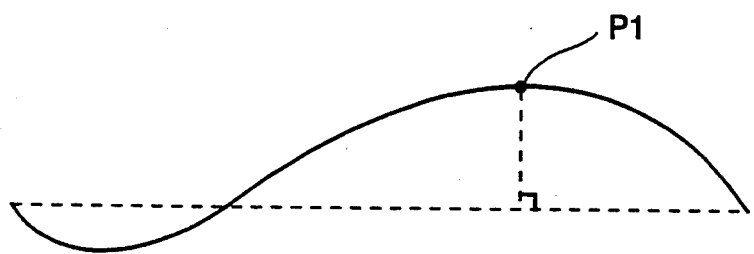
FIG. 12 is a chart for explaining that a segment is in an upwardly convex state.
Figure 13:
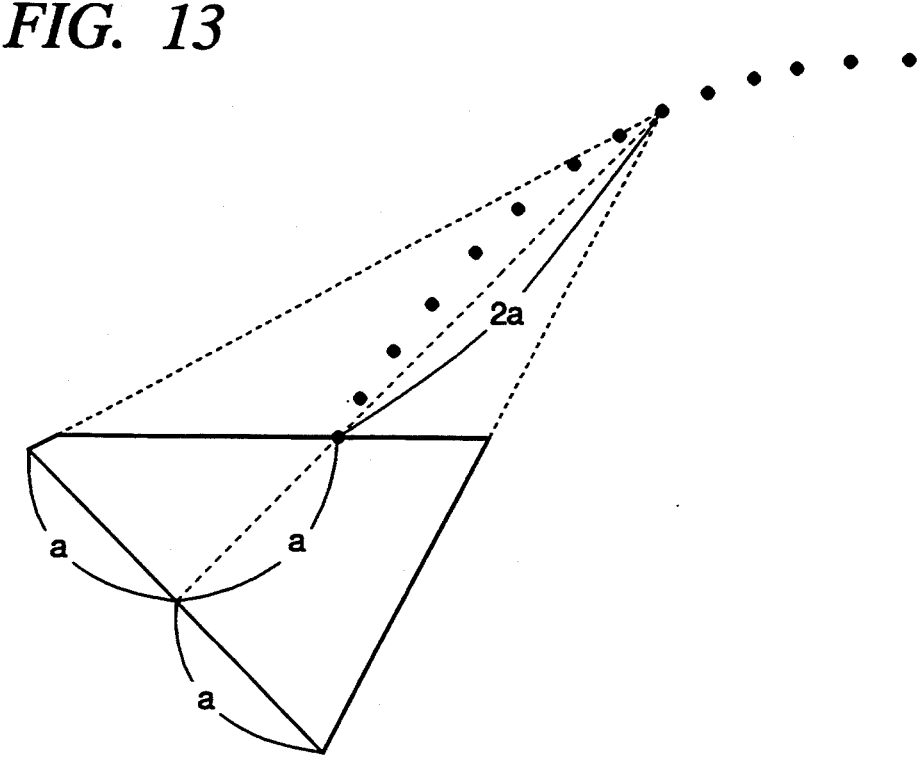
FIG. 13 is a chart for explaining a conventional method to track a segment.
Figure 14:
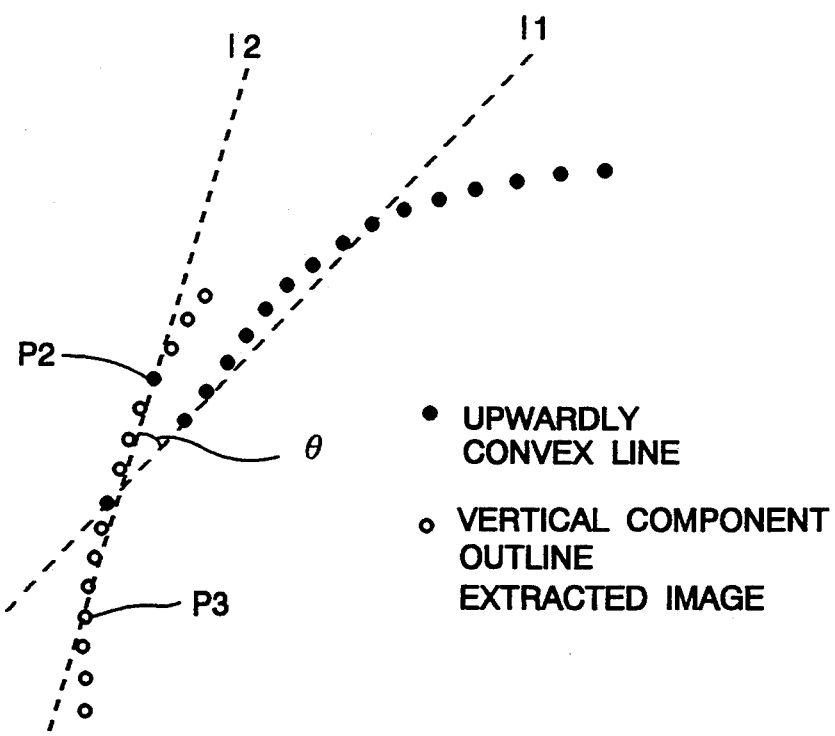
FIG. 14 is a drawing for explaining a conventional method to track a segment.
Figure 15:
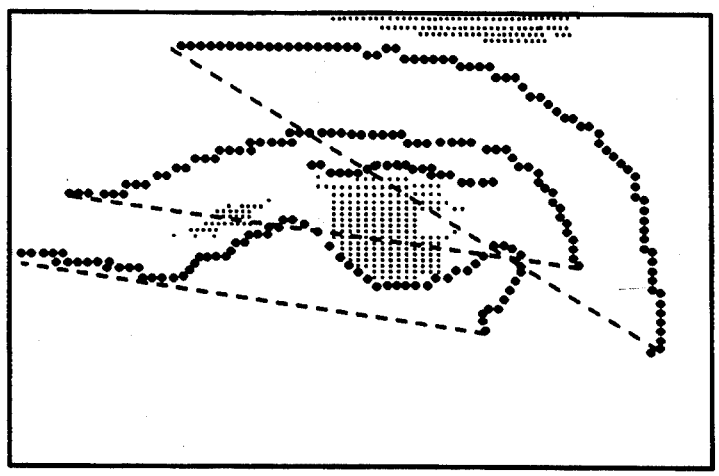
FIG. 15 is a drawing for explaining an upper eyelid detecting method in a conventional method.
Figure 16:
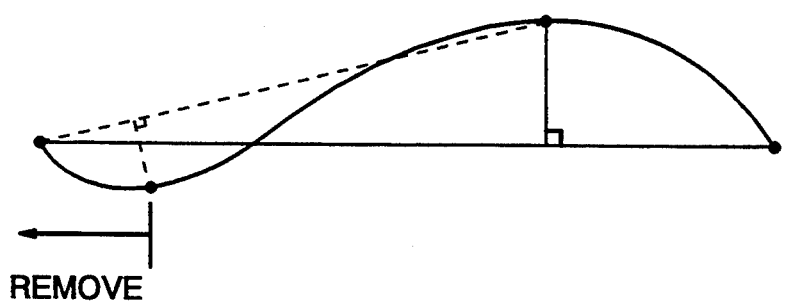
FIG. 16 is a drawing for explaining an upper eyelid detecting method in a conventional method.

In the detected upper eyelid candidate area, the upper eyelid and pupil can be easily distinguished based on a width of the area. Specifically, the upper eyelid area is an area where an average of brightness values is darkest within an area whose horizontal width is greater than the pupil. The vicinity of an eye does not have large changes in ups and downs and this upper eyelid area detecting method is not affected by a shadow due to changes in lighting conditions. With respect to an input image 801 shown in FIG. 8, the aforementioned eyelid area corresponds to an upper eyelid area 802.

When determining inner and outer canthus spots and upper eyelid line in their vicinity, the darkest point is obtained first by comparing with the vicinity. This point agrees with a position where a first differential of an image is 0 and, when compared with the second differential used in prior art, it is junior, so that an effect of not being influenced by noise or the like can be attained. And, since the double-edged eyelid does not form an edge when seen from the direction parallel to wrinkles, it has nothing to do with data detected by this process and not affected.

Furthermore, since the inner and outer canthus points are part of the upper eyelid, the inner and outer canthus points and upper eyelid line in their vicinity can be obtained by carrying out the logical OR with the above eyelid area. With respect to the input image 801 shown in FIG. 1, the above inner and outer canthus points and upper eyelid line in their vicinity correspond to an inner canthus 803, outer canthus 804 and primary upper eyelid line 805.

To determine the upper eyelid line in the vicinity of the pupil, a position where a second differential of the image is 0 when seen from the vertex direction is obtained, and a dot group which is closest to the inner and outer canthus points and upper eyelid line in their vicinity is determined. Using the second differential of the image is the same as in the prior art, but a more stable position can be obtained by combining with other information which can be obtained stably. With respect to the input image 801 shown in FIG. 8, the upper eyelid line in the vicinity of the pupil corresponds to a secondary eyelid line 806.

Figure 1:
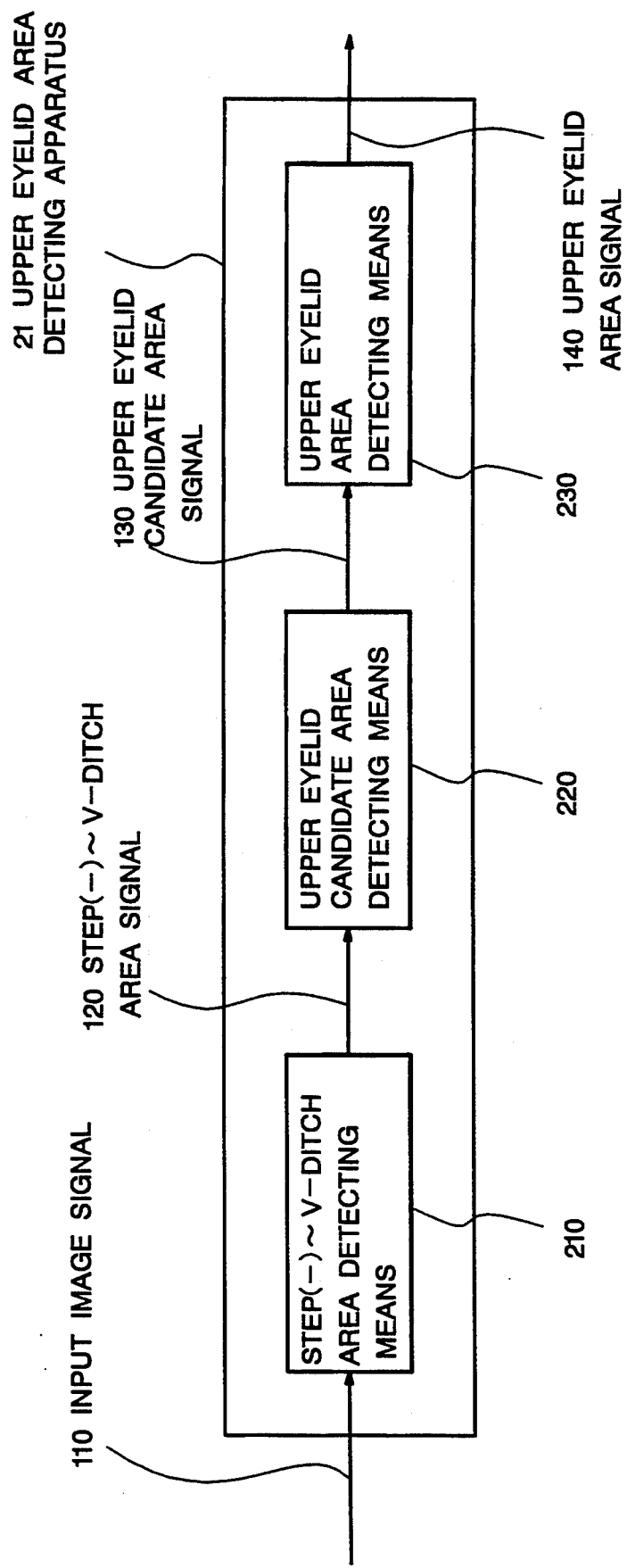
FIG. 1 is a block diagram showing the construction of an embodiment of an upper eyelid area detecting apparatus to which this invention is applied.

FIG. 1 shows the construction of a preferable embodiment of the upper eyelid area detecting apparatus to which this invention is applied. In FIG. 1, an upper eyelid area detecting apparatus 21 consists of a Step(-) through V-Ditch area detecting means 210 (original area detecting means), an upper eyelid candidate area detecting means 220 and an upper eyelid area detecting means 230. The Step(-) through V-Ditch area detecting means 210 examines an input image signal 110 having an eye and its vicinity photographed from the vertex to jaws to obtain a Step(-) through V-Ditch area signal 120. The upper eyelid candidate area detecting means 220 selects from the Step(-) through V-Ditch area signal 120 a signal indicating an area where width is larger than a certain threshold (value on the basis of the pupil width) and smaller than a distance between the inner and outer canthus points to obtain as an upper eyelid candidate area signal 130. And, the upper eyelid area detecting means 230 calculates each average value of brightness values in the area indicated by the upper eyelid candidate area signal 130 to obtain as an upper eyelid area signal 140 a signal that the average value indicates the darkest area.

Figure 4:
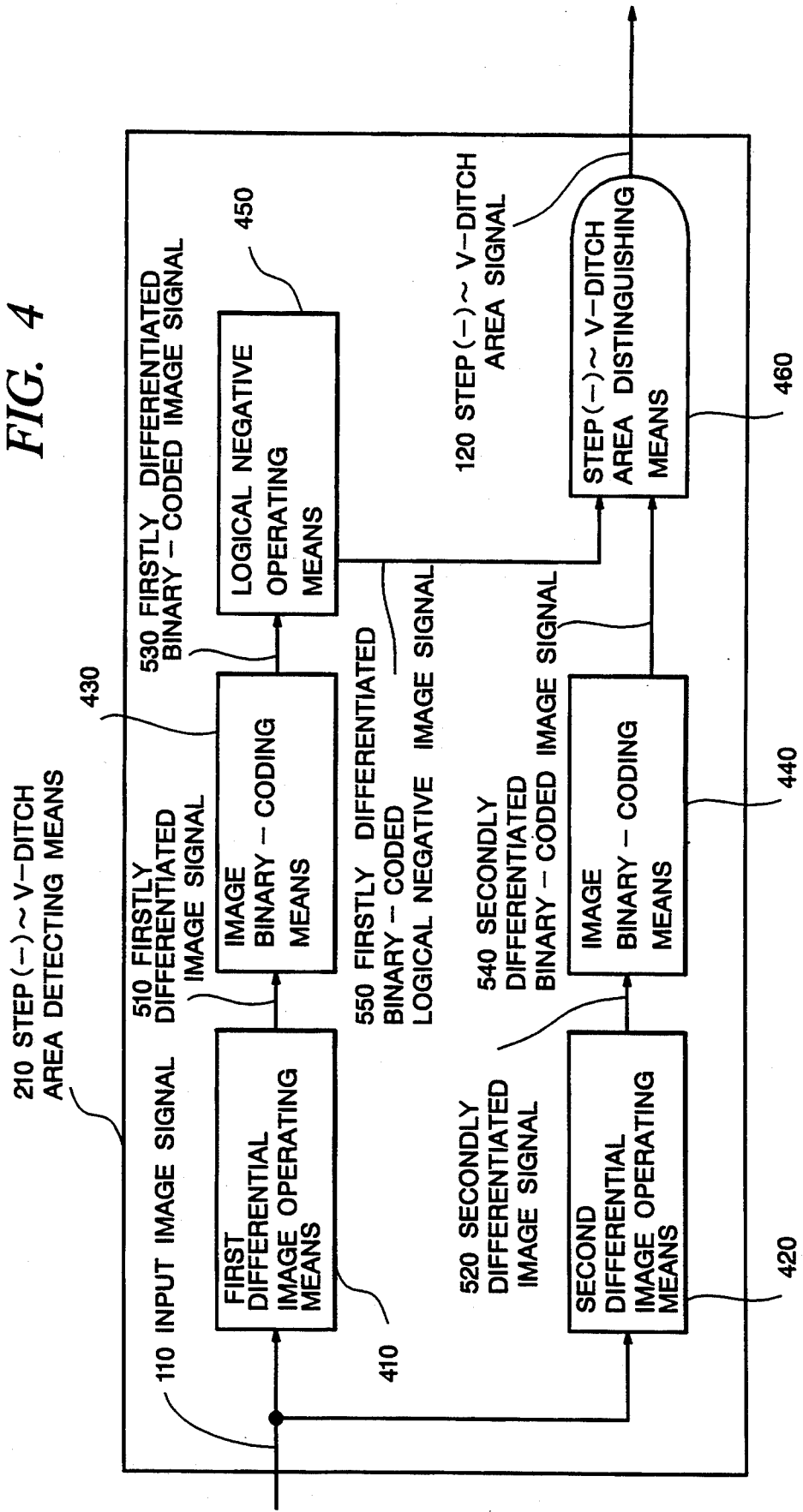
FIG. 4 is a block diagram showing an example of the construction of a Step(-) through V-Ditch area detecting means of the apparatus shown in FIG. 1.

An example of the construction of the Step(-) through V-Ditch area detecting means 210 will be described with reference to FIG. 4. The Step(-) through V-Ditch area detecting means 210 has a first differential image operating means 410, a second differential image operating means 420, binary-coding means 430, 440, a logical negative operating means 450, and a Step(-) through V-Ditch area distinguishing means 460.

With the first differential image operating means 410, the image having the input image signal 110 as an input is subjected to a first differential in a certain direction to obtain a firstly differentiated image signal 510. With the second differential image operating means 420 for conducting a second differential with respect to the same direction as the above direction having the input image signal 110 as an input, a secondly differentiated image signal 520 is obtained. The firstly differentiated image signal 510 and the secondly differentiated image signal 520 are binary-coded by the binary-coding means 430, 440, respectively to obtain a firstly differentiated binary-coded image signal 530 and a secondly differentiated binary-coded image signal 540. The firstly differentiated binary-coded image signal 530 is operated by the logical negative operating means 450 to obtain a firstly differentiated binary-coded logical negative image signal 550. With the Step(-) through V-Ditch area distinguishing means 460 for carrying out the logical OR between the firstly differentiated binary-coded logical negative image signal 550 and the secondly differentiated binary-coded image signal 540, the Step(-) through V-Ditch area signal 120 is obtained.

Figure 2:
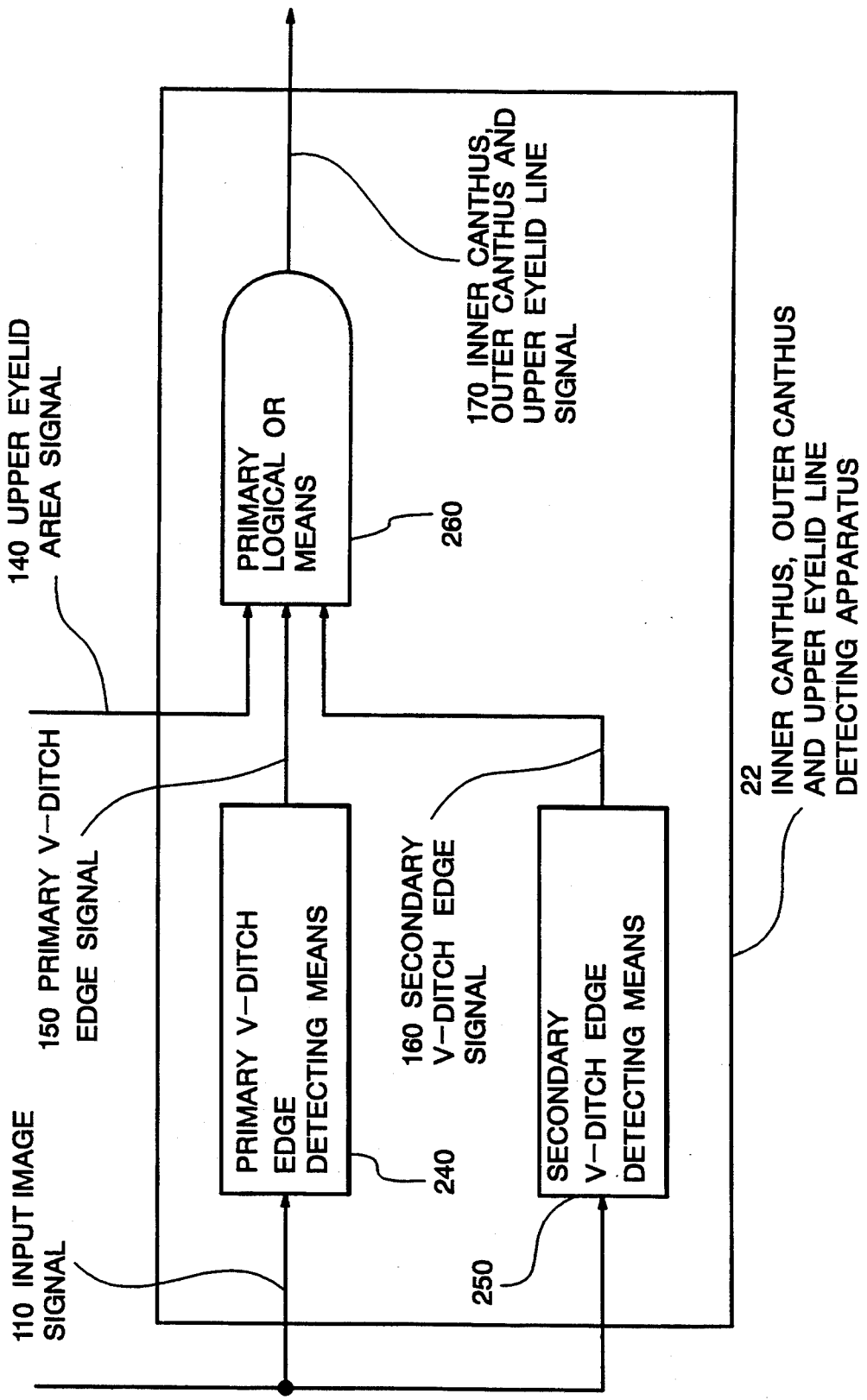
FIG. 2 is a block diagram showing the construction of an embodiment of an inner canthus, outer canthus and upper eyelid line detecting apparatus to which this invention is applied.

An inner canthus, outer canthus and upper eyelid line detecting apparatus 22 of this invention will be described with reference to FIG. 2. The inner canthus, outer canthus and upper eyelid line detecting apparatus 22 consists of a primary V-Ditch Edge detecting means (primary eye structure candidate detecting means) 240, a secondary V-Ditch Edge detecting means (secondary eye structure candidate detecting means) 250, and a primary logical OR means 260.

The primary V-Ditch Edge detecting means 240 examines an image from a certain direction with an input image signal 110 having an eye and its vicinity of a human face photographed and an upper eyelid area signal 140 of the image inputted to obtain a primary V-Ditch Edge signal 150.

The secondary V-Ditch Edge detecting means 250 examined the above image from the direction different from the aforementioned direction to obtain a secondary V-Ditch Edge signal 160.

And, the primary logical OR means 260 carries out the differential OR among the above upper eyelid area signal 140, primary V-Ditch Edge signal 150 and secondary V-Ditch Edge signal 16 to obtain an inner and outer canthus points and upper eyelid signal 170. The upper eyelid line obtained here corresponds to a primary upper eyelid line 805 in FIG. 8.

Figure 5:
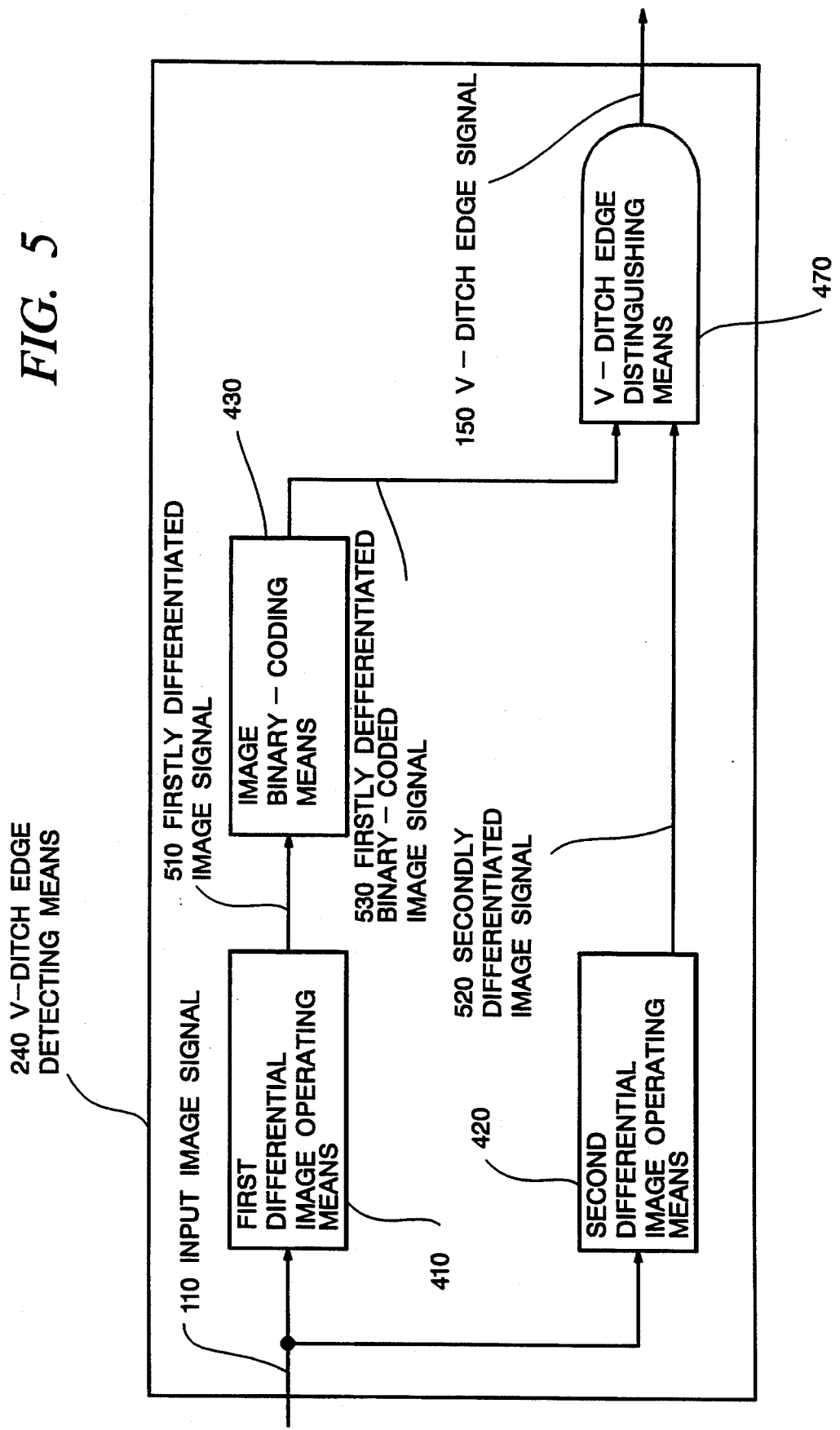
FIG. 5 is a block diagram showing an example of the construction of a primary V-Ditch Edge detecting means of the apparatus shown in FIG. 2.

One example of the construction of the primary V-Ditch Edge detecting means 240 will be described with reference to FIG. 5. The primary V-Ditch Edge detecting means 240 consists of a first differential image operating means 410, a second differential image operating means 420, an image binary-coding means 430 and a V-Ditch Edge distinguishing means 470.

With the first differential image operating means 410, the image having the input image signal 110 as an input is subjected to a first differential in a certain direction to obtain a firstly differentiated image signal 510. With the second differential image operating means 420, the image having the input image signal 110 as an input is subjected to a second differential with respect to the same direction as the above direction to obtain a secondly differentiated image signal 520. The firstly differentiated image signal 510 is binary-coded by the image binary-coding means 430 to obtain a firstly differentiated binary-coded image signal 530. The V-Ditch Edge distinguishing means 470 examines a code of the secondly differentiated image signal 520 at a boundary of the firstly differentiated binary-coded image signal 530 and outputs a V-Ditch Edge signal 150 when it is positive.

As to the secondary V-Ditch Edge detecting means 250, the construction is quite the same with the primary V-Ditch Edge detecting means 240 except that the direction for differentiating the image is different.

And, in the inner canthus, outer canthus and upper eyelid line detecting apparatus 22, the V-Ditch Edge detecting means 240 and 250 with different directions are combined to make the construction minimum. And, another V-Ditch Edge detecting means with different direction may be added.

Now, using the aforementioned upper eyelid area detecting apparatus 21 and the inner canthus, outer canthus and upper eyelid line detecting apparatus 22, an eye structure detecting apparatus 30 for detecting an eye structure of an embodiment of this invention will be described with reference to FIG. 3.

Figure 3:
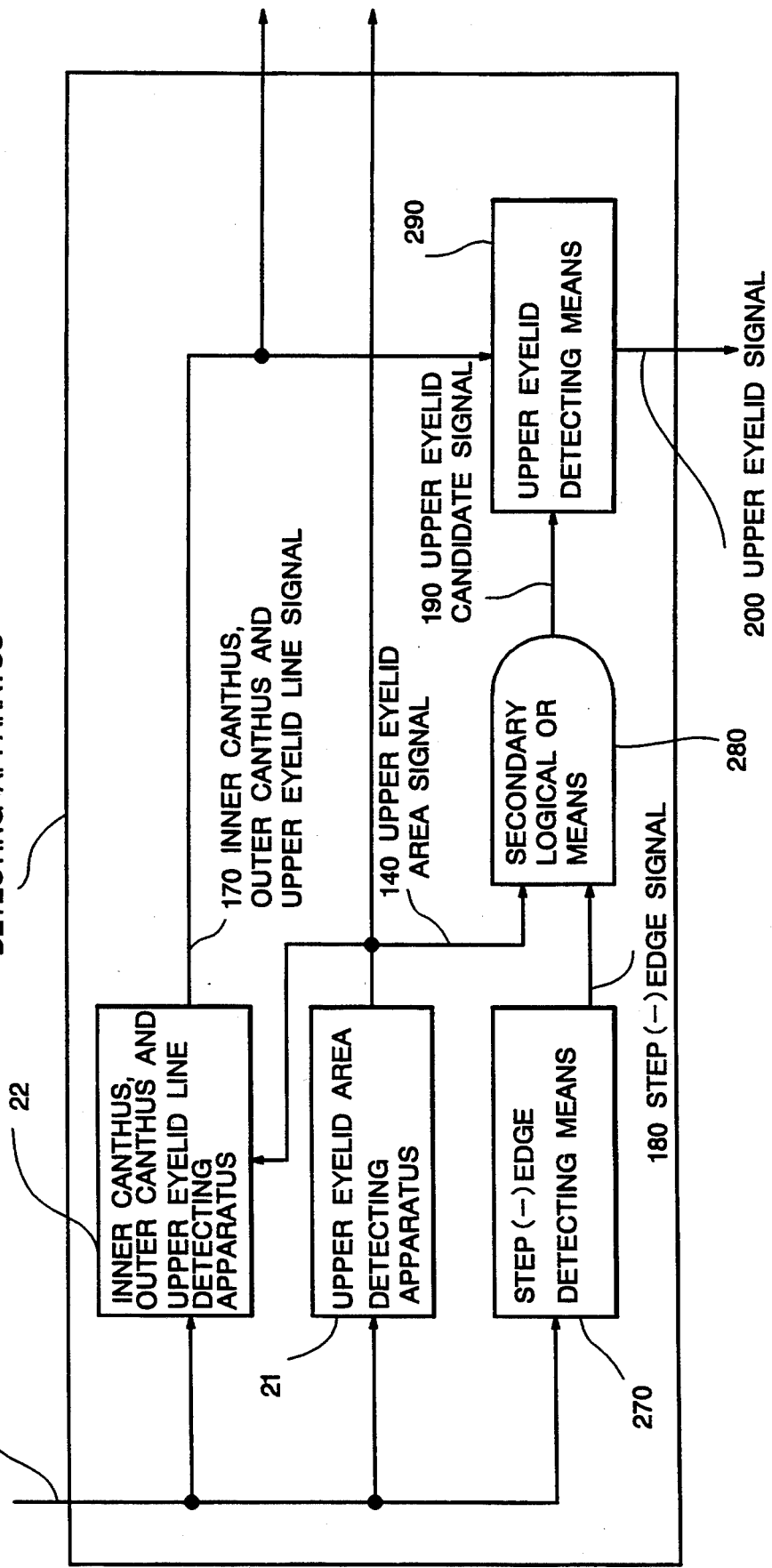
FIG. 3 is a block diagram showing the construction of an embodiment of an eye structure detecting apparatus to which this invention is applied.

As shown in FIG. 3, the eye structure detecting apparatus 30 consists of an upper eyelid area detecting apparatus 21, an inner canthus, outer canthus and upper eyelid line detecting apparatus 22, a Step(-)Edge detecting means 270, a secondary logical OR means 280 and an upper eyelid detecting means 290.

When an input image signal 11 having an eye and its vicinity of a human face photographed is inputted, an upper eyelid area signal 140 is obtained by the upper eyelid area detecting apparatus 21. And, an inner canthus point, outer canthus point and upper eyelid line signal 170 is obtained by the inner canthus, outer canthus and upper eyelid line detecting apparatus 22. Their operations are as described above.

With the Step(-)Edge detecting means 270, a Step(-)Edge signal 180 is obtained by examining the input image from the vertex direction. The logical OR of upper eyelid area signal 140 and Step(-)Edge signal 180 is operated by the secondary logical OR means 280 to obtain an upper eyelid candidate signal 190.

The upper eyelid detecting means 290 calculates a point-to-point distance between the inner canthus point, outer canthus point and upper eyelid line signal 170 and the upper eyelid candidate signal 190 in the vertex direction with respect to each point to obtain an upper eyelid signal 200 as the nearest point group. The upper eyelid line obtained by the upper eyelid signal 200 corresponds to a secondary upper eyelid line 805 in FIG. 8.

Figure 6:
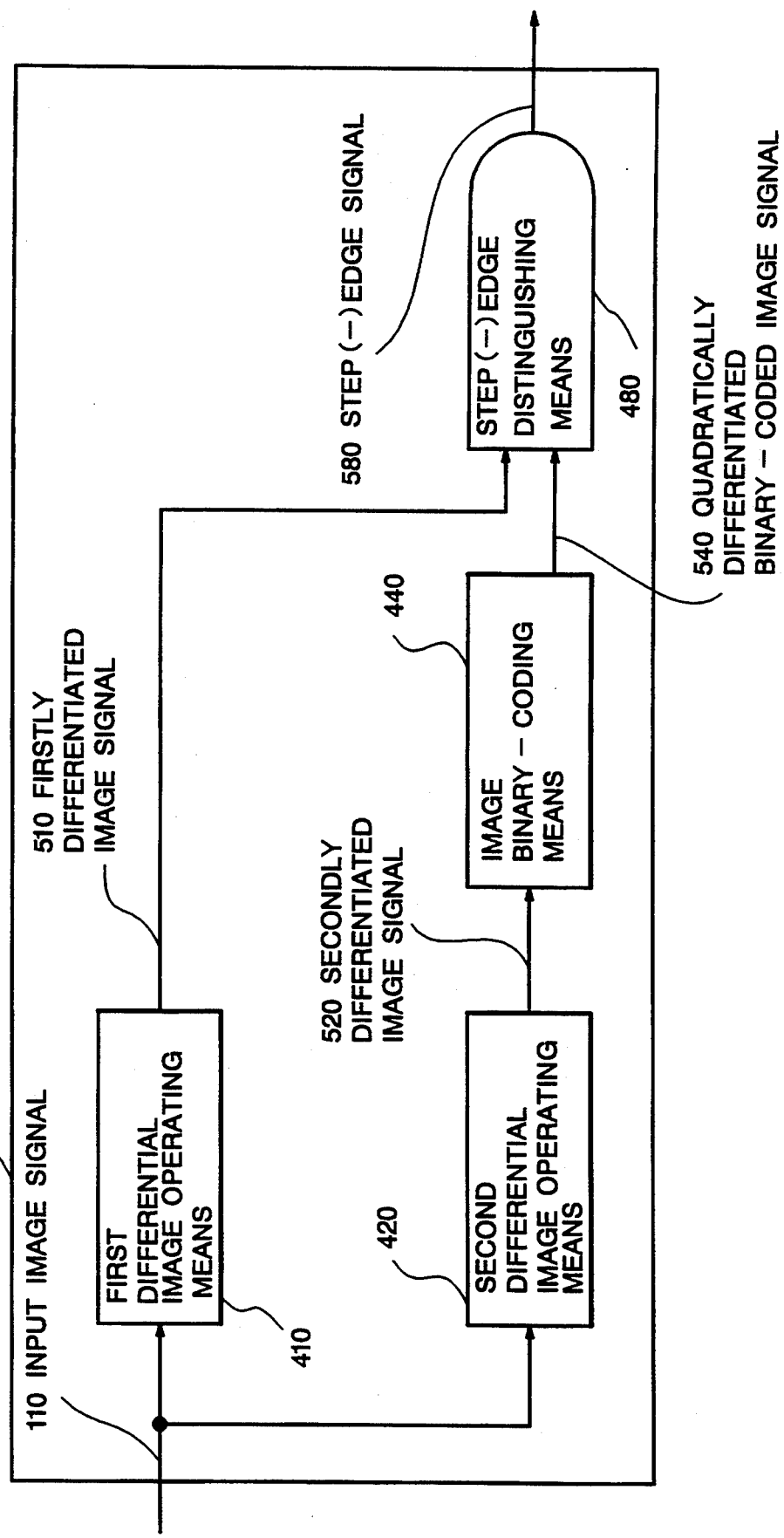
FIG. 6 is a block diagram showing an example of the construction of a Step(-)Edge detecting means of the apparatus shown in FIG. 3.

One example of the construction of the Step(-)Edge detecting means 270 will be described with reference to FIG. 6. The Step(-)Edge detecting means 270 consists of a first differential image operating means 410, a second differential image operating means 420, an image binary-coding means 440, and a Setp(-)Edge distinguishing means 480. The first differential image operating means 410 firstly differentiate an image having an input image signal 110 as an input in one direction to obtain a firstly differentiated image signal 510. The second differential image operating means 420 secondly differentiate an input image signal 110 in the direction same to the above direction to obtain a secondly differentiated image signal 520.

The secondly differentiated image signal 520 is binary-coded by the image binary-coding means 440 to obtain a secondly differentiated binary-coded image signal 540. The Setp(-)Edge distinguishing means 480 examines a code of the firstly differentiated image signal 510 at a boundary of the secondly differentiated binary-coded image signal 540 and outputs a Setp(-)Edge signal 580 when it is positive.

As described above, with the eye structure detecting method and detecting apparatus of this invention, an eye structure can be detected in detail with a small number of parameters as compared with a conventional method.

It is needless to mention that various changes and modifications may be made in addition to the embodiments described in this invention.

Every modified embodiments without separating from the spirit and scope of this invention are included in the scope of the patent claims.

What is claimed is:

1. A method for detecting an upper eyelid area comprising steps of:
   examining an image of a vicinity of a human face photographed from the vertex to the jaws of the human face, said image including an eye, a pupil, and an upper eyelid area,
   measuring how brightness of the image changes with position as measured at successive positions in a given direction on the image,
   detecting a first position of the successive positions where the brightness of the image has decreased,
   detecting a second position of the successive positions where the brightness has decreased and then increased,
   detecting an intermediate area positioned between said first and second positions,
   measuring, for a plurality of sub-areas within said intermediate area, averages of values of the brightness of the image, and
   detecting from said intermediate area one of said sub-areas whose width is larger than the pupil's width and whose average of values of the brightness of the image in said area is lowest among said averages of values, as the upper eyelid area.

2. A method for detecting an inner canthus, outer canthus, and upper eyelid area, comprising the steps of:
   examining an image of a vicinity of a human face photographed from the vertex to the jaws of the human face, said image including an eye, a pupil, and an upper eyelid area,
   measuring how brightness of the image changes with position as measured at successive positions in a given direction on the image,
   detecting a first position of the successive positions where the brightness of the image has decreased,
   detecting a second position of the successive positions where the brightness has decreased and then increased,
   detecting an intermediate area positioned between said first and second positions,
   measuring, for a plurality of sub-areas within said intermediate area, averages of values of the brightness of the image,
   detecting from said intermediate area one of said sub-areas whose width is larger than the pupil's width and whose average of values of the brightness of the image in said area is lowest among said averages of values, as the upper eyelid area,
   finding the darkest point on said image to detect the inner canthus and outer canthus points and their adjacent dot groups which become candidates for the upper eyelid line, and
   carrying out a logical OR between said upper eyelid area and said dot groups to detect the inner canthus, outer canthus, and their adjacent upper eyelid line.

3. A method for detecting an inner canthus, outer canthus and upper eyelid line comprising the steps of:
   examining an image of a vicinity of a human face photographed from the vertex to the jaws of the human face, said image including an eye, a pupil, and an upper eyelid area,
   measuring how brightness of the image changes with position as measured at successive positions in a given direction on the image,
   detecting a first position of the successive positions where the brightness of the image has decreased,
   detecting a second position of the successive positions where the brightness has decreased and then increased,
   detecting an intermediate area positioned between said first and second positions,
   measuring, for a plurality of sub-areas within said intermediate area, averages of values of the brightness of the image,
   detecting from said intermediate area one of said sub-areas whose width is larger than the pupil's width and whose average of values of the brightness of the image in said area is lowest among said averages of values, as the upper eyelid area,
   finding the darkest point on said image to detect the inner canthus and outer canthus points and a primary dot group in their vicinity which become a candidate for the upper eyelid line,
   carrying out a logical OR between said upper eyelid area and said dot groups to detect the inner canthus, outer canthus and the primary upper eyelid line in their vicinity,
   examining said image from the vertex, while measuring how brightness of the image changes with position, detecting a point where the brightness of the image decreases, and carrying out the logical OR between the change point and said upper eyelid area to detect a secondary dot group which becomes a candidate for the upper eyelid, and
   calculating a distance between said primary upper eyelid line and said secondary candidate dot group in a vertex direction to detect a dot group with smallest distance as a secondary upper eyelid line.

4. An apparatus for detecting an eye structure comprising:
- a primary area detecting means for examining an image of a vicinity of a human face photographed from the vertex to the jaws of the human face, said image including an eye, a pupil, and an upper eyelid area, and detecting a first position where brightness of the image decreases, and a second position where the brightness of the image decreases and then increases, as measured along a direction on the image,
- an upper eyelid candidate area detecting means for detecting from said primary area, as an upper eyelid candidate area, an area whose width is larger than a certain set value,
- a secondary area detecting means for measuring, for a plurality of sub-areas within said upper eyelid candidate area, averages of values of the brightness of the image, and detecting as the upper eyelid area an area from among said sub-areas whose average of values of the brightness of the image in said area is lowest among said averages of values.

5. An apparatus for detecting an eye structure according to claim 4, wherein said certain set value is set on the basis of the pupil's width.

6. An apparatus for detecting an eye structure according to claim 4, wherein said primary area detecting means comprises:
- a first differential operating means for firstly differentiating said image from the vertex to the jaws,
- a second differential operating means for secondly differentiating said image from the vertex to the jaws,
- a primary binary-coding means for binary-coding said firstly differentiated image signal,
- a secondary binary-coding means for binary-coding said secondly differentiated image signal,
- a logical negative operating means for obtaining a logical negative signal from said binary-coded firstly differentiated image signal, and
- a logical OR operating means for carrying out a logical OR between said firstly differentiated image signal of the logical negative and the binary-coded secondly differentiated image signal.

7. An apparatus for detecting an eye structure comprising:
- an upper eyelid area detecting means for obtaining an upper eyelid area detected signal by detecting an upper eyelid area from an image of a vicinity of a human face, said image including an eye and an upper eyelid area,
- a primary candidate detecting means for obtaining a primary candidate point detected signal by detecting a primary candidate point which is a point where brightness of the image first decreases and then increases as the image is examined in a vertex direction,
- a secondary candidate detecting means for obtaining a secondary candidate point detected signal by detecting a secondary candidate point which is a point where brightness of the image first decreases and then increases as the image is examined from a direction perpendicular to the vertex direction, and
- a logical OR operating means for carrying out a logical OR operation among all three of said upper eyelid area detected signal, said primary candidate point detected signal, and said secondary candidate point detected signal, to output as the inner canthus, outer canthus, and upper eyelid line detected signals.

8. An apparatus for detecting an eye structure according to claim 7, wherein the upper eyelid area detecting means comprises:
- a primary area detecting means for detecting a first position where brightness changes from lightness to darkness, a second position where brightness changes from lightness to darkness and then to lightness, and an intermediate area positioned between the first and second positions, by examining said image, said image being of a vicinity of a human face photographed from the vertex to the jaws of the human face,
- an upper eyelid candidate area detecting means for detecting from said primary area, as an upper eyelid candidate area, an area whose width is larger than a certain set value,
- a secondary area detecting means for measuring, for a plurality of sub-areas within said upper eyelid candidate area, averages of values of the brightness of the image, and detecting as the upper eyelid area an area from among said sub-areas whose average of values of the brightness of the image in said area is lowest among said averages of values.

9. An apparatus for detecting an eye structure according to claim 7, wherein said primary candidate detecting means and secondary candidate detecting means comprise:
- a first differential operating means for firstly differentiating said image in one of the vertex direction and the direction perpendicular to the vertex direction,
- a second differential operating means for secondly differentiating said image in one of the vertex direction and the direction perpendicular to the vertex direction,
- a binary-coding means for binary-coding said firstly differentiated image signal, and
- a judging means for examining a code of said secondly differentiated image signal at the boundary of said binary-coded firstly differentiated image signal to output as the primary or secondary candidate point when the code is positive.

10. An apparatus for detecting an eye structure comprising:
- an upper eyelid area detecting means for obtaining an upper eyelid area detected signal by detecting an upper eyelid area from an image of a vicinity of a human face photographed from the vertex to the jaws of the human face, said image including an eye, a pupil, and an upper eyelid area,
- an inner canthus, outer canthus and upper eyelid line detecting means for detecting inner and outer canthus points and a primary upper eyelid line from said image,
- a primary detecting means for obtaining primary point detected signal by detecting a primary point where brightness changes from lightness to darkness by examining said image from the vertex,
- a secondary detecting means for detecting a candidate dot group which is a candidate for the upper eyelid area by carrying out a logical OR between the detected signal of said upper eyelid area and the detected signal of said primary point, and
- an upper eyelid detecting means for detecting, from among a plurality of said candidate dot groups, a dot group as a secondary upper eyelid line by calculating, for each said candidate dot group, a distance between said inner and outer canthus points and primary upper eyelid line and said candidate dot group for the upper eyelid area in a vertex direction, and choosing the dot group that results in the smallest distance calculated.

11. An apparatus for detecting an eye structure according to claim 10, wherein said primary detecting means comprises:

a first differential operating means for firstly differentiating said image in one of the vertex direction and a direction perpendicular to the vertex direction, a second differential operating means for secondly differentiating said image in one of the vertex direction and the direction perpendicular to the vertex direction, a binary-coding means for binary-coding said secondly differentiated image signal, and a judging means for examining a code of said firstly differentiated image signal at the boundary of said binary-coded secondly differentiated image signal to output as the primary point when it is positive.

* * * * *

UNITED STATES PATENT AND TRADEMARK OFFICE
CERTIFICATE OF CORRECTION

PATENT NO.   : 5,432,866
DATED        : July 11, 1995
INVENTOR(S)  : Shizuo SAKAMOTO It is certified that error(s) appears in the above-identified patent and that said Letters Patent is hereby corrected as shown below:

Col. 7, line 56, delete "de" and insert --be--.

Col. 11, line 9, delete "Setp" and insert --Step--.

Col. 11, line 21, delete "Setp" and insert --Step--.

Col. 11, line 24, delete "Setp" and insert --Step--.

Signed and Sealed this

Thirteenth Day of February, 1996

*Attest:*

BRUCE LEHMAN

*Attesting Officer*   Commissioner of Patents and Trademarks